June 19, 1951  V. E. CARBONARA  2,557,340
OPTICAL HORIZONTAL REFERENCE
Filed June 9, 1948
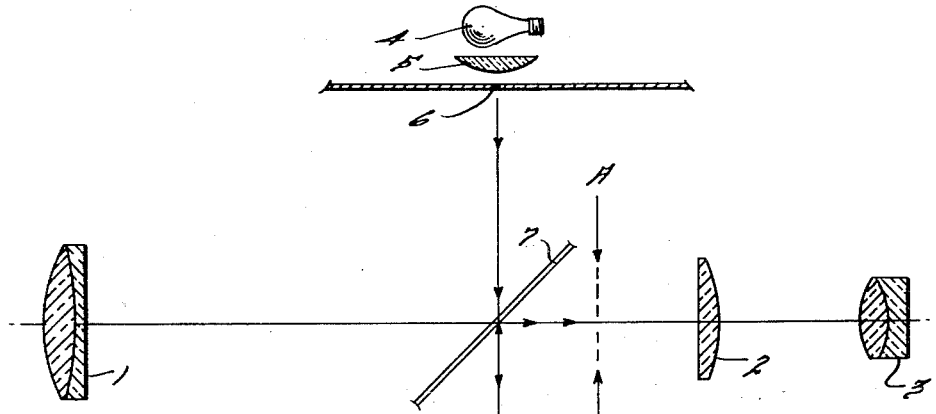
Fig. 1.
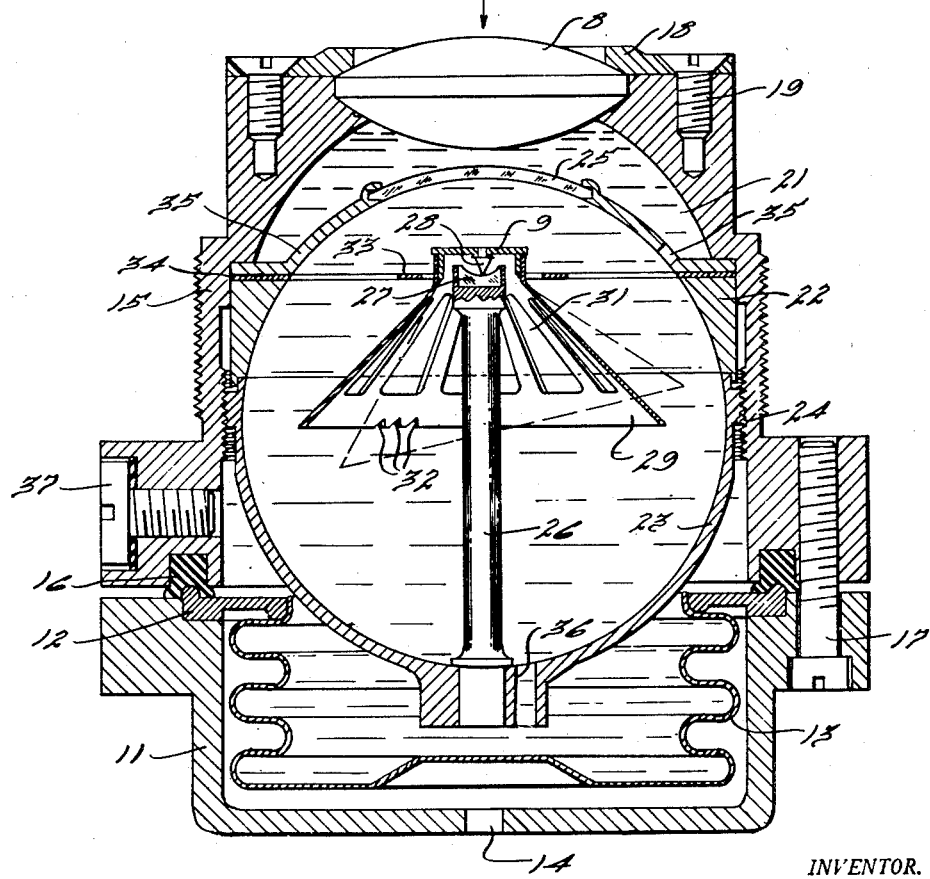
INVENTOR.
Victor E. Carbonara
BY
ATTORNEY Patented June 19, 1951

2,557,340

UNITED STATES PATENT OFFICE 2,557,340

OPTICAL HORIZONTAL REFERENCE

Victor E. Carbonara, Manhasset, N. Y., assignor, by mesne assignments, to Kollsman Instrument Corporation, Elmhurst, N. Y., a corporation of New York Application June 9, 1948, Serial No. 31,928

3 Claims. (Cl. 88—1)

This invention relates to means providing a horizontal reference by the position of the image of an illuminated slit or orifice determined by the location of a mirror supported upon a pendulous mounting.

The reference is of general application in any system in which the determination of the horizontal or vertical planes is desirable and in which there is provided means, optical or electrical, such as the human eye, photoelectric cells, and other like responsive means for determining the position of the slit or orifice image.

Conventionally, such horizontal references are provided by an air or gas bubble in a liquid, illuminated and suitably interposed by an optical system in the field of view of an observer, but these bubble references are subject to many disadvantages, both optical and physical, and the object of this invention is to provide an improved horizontal reference by the use of a pendulous mirror, the reflected light from which is suitably imaged to indicate the position of the mirror face with respect to the horizontal plane.

Another object of the invention is to provide a horizontal reference including a reflecting mirror provided with a depending skirt permitting universal tilting of the mirror and with the center of gravity of the skirt placed a substantial distance below the pivot point of the mirror so as to secure the desired pendulosity.

Another object of the invention is the provision of a horizontal reference including a reflecting mirror mounted upon a pendulous skirt within a damping fluid contained within a substantially spherical housing to reduce swirl.

Another object of the invention is the provision of a horizontal reference in accordance with the preceding objects in which there is included a lens for forming the image of an illuminated slit or orifice, the light from which is reflected from the pendulous mirror.

Other objects and features of the invention will be readily apparent to those skilled in the art from the specification and appended drawings illustrating certain preferred embodiments in which:

Figure 1 shows the horizontal reference shown principally in vertical section combined with a simple optical system shown in diagrammatic arrangement.

In the single figure of the drawing, the optical reference is shown as it might be utilized in its simplest form upon a leveling instrument and it will readily be understood that the reference may be used in any other location where it is desired to determine the vertical or horizontal plane as in leveling tables, sextants, and other general constructions in which a horizontal or vertical reference is desired.

In the simple leveling instrument application of the drawing, there is shown an objective lens 1 whose focal plane is designated at AB and an eyepiece for viewing the image thereat formed by the lenses 2 and 3. The horizontal reference is indicated as providing an image of an illuminated slit or orifice also in the focal plane AB of the objective lens 1. To form the slit image, there is provided a light source 4 from which light rays pass through a condenser lens 5 and through a narrow slit 6 and thence through a reflecting-transparent glass or pellicle 7 and lens 8 to the surface of mirror 9 whence it is reflected back through the lens 8 and from the reflecting surface of the glass 7 to form an image of the illuminated slit in the focal plane AB. To secure this transmission-reflection, the glass 7 is placed at a 45° angle with respect to the axes of the optical and light systems and the surface of the mirror 9 is located so that its combined horizontal and vertical distance from the focal plane AB is one-half of the focal length of the objective lens 1. When so located, the angular movements of the optical axis and the slit image will be the same and no accommodation of the eye will be required to collimate the slit image with the observed objective.

The specifically illustrated structure of the pendulous mirror and imaging lens mounting will now be particularly described.

The base is indicated at 11 as being cup-shaped and attached to its upper flange is an annulus 12 to whose inner edge is secured a flexible bellows type inner enclosure 13 designed to provide for expansion upon change in volume of the liquid in which the pendulous mirror is immersed. The base 11 is provided also with an air breather opening 14. Upon the flange of the cup-shaped base 11 is mounted the upper portion of the outer enclosure indicated at 15 and sealed to the outer edge of the annulus 12 by means of a sealing washer 16, the enclosure mounting being rigidly made through a plurality of studs of which one is indicated at 17. The upper portion 15 of the outer receptacle is provided with a top opening in which is disposed the lens 8 which is clamped therein in sealing relation by a top plate 18 through the studs 19.

Within the outer enclosure formed by the members 11 and 15 is disposed an interior spherical enclosure formed by a top piece 21, an intermediate piece 22, and a bottom piece 23 clamped together within the outer enclosure by the threading of the lower piece 23 into the interior wall of the member 15 as indicated at 24. The top piece 21 of the spherical enclosure is provided with a transparent window 25 through which the light rays pass.

A supporting post 26 is rigidly mounted in the lower piece 23 of the inner spherical enclosure and carries an inner hemispherically concave jewel seat 27 within which rests a pivot 28 upon the underside of the mirror 9 which is provided with a highly polished and reflective upper surface. Depending from the mirror 9 by a securement adjacent the periphery thereof is a pendulous skirt 29 of generally conical shape provided with a plurality of cut-out portions 31 designed to lower the center of gravity thereof. To establish the desired normal horizontal position of the mirror 9 with respect to the remaining structure of the reference, the edge of the skirt may be filed or clipped as indicated at 32 to secure the needed balance.

To insure return of the pivot 28 to the seat 27 in case of a large displacement of the reference such as produced by the inverting thereof, an annular retainer 33 is provided and is maintained in place by radial supports extending from a second annulus 34 clamped between the pieces 21 and 22 of the inner spherical enclosure. Openings are provided in the enclosure piece 21 at 35 and in the enclosure piece 23 at 36 to permit free flow of fluid between the inner and outer enclosures. A fill plug indicated at 37 is provided in the member 15 to permit filling of the reference enclosures with a damping fluid such as silicone oil, it being understood the fluid is maintained within the bellows in the lower portion of the outer enclosure to permit expansion of the overall container volume upon a change in liquid volume.

It is believed that the operation of the reference will be readily apparent from the previous description.

Light rays from the source 4 pass through the condenser lens 5, slit 6, transparent glass 7, lens 8, the liquid in the enclosure and the window 25 to the surface of mirror 9 whence they are reflected through the imaging lens 8 and from the reflecting surface of the glass 7 to form a real image of the slit of light at the focal plane AB of the optical system. When viewed through the eyepiece, the correspondence of the slit image with an observed objective will indicate the level of the instrument with respect to the objective. If it is desired to maintain the axis of the instrument itself horizontal, as in a level, a simple scratched transparent reticle may be placed at the focal plane AB so that the slit image may be imposed thereon to establish the instrument axis in a horizontal plane.

The center of gravity of the pendulous skirt 29 is, by means of its length and by the cutout portions 31, disposed substantially below the engagement of the pivot 28 and seat 27 so as to secure the desired pendulosity of the mirror. The spherical interior surface of the interior enclosure formed by the pieces 21, 22 and 23 minimizes the imparting of swirl to the damping liquid and hence minimizes the period for the mirror to assume its level position after the movement of the reference enclosure, and the liquid itself serves to dampen pendulum oscillations so that the mirror quickly returns to its level position after being displaced therefrom, as for instance into the dotted line position shown in the drawing.

While a particular preferred embodiment of the invention has been illustrated in the drawing, it is understood that the invention is not limited thereto, as many variations will be readily apparent to those skilled in the art and the invention is to be given its broadest possible interpretation within the terms of the following claims.

What is claimed is:

1. An optical horizontal reference comprising a light source, an aperture for said light source, a pendulous mirror from which the light from said aperture is reflected, an enclosure for said mirror, a post mounted in said enclosure and having a seat in which a pivot on said mirror is disposed for universal tilting movement, a conical skirt depending from said mirror about said post to permit substantial tilting movement of the mirror with respect to its supporting post, a damping liquid in said enclosure about both said mirror and skirt, and a lens in contact with the damping liquid and disposed in the path of light to and from the mirror to form any image of the aperture.

2. An optical horizontal reference comprising a light source, an aperture for said light source, a pendulous mirror from which the light from said aperture is reflected, an enclosure for said mirror, a post mounted in said enclosure and having a seat in which a pivot on said mirror is disposed for universal tilting movement, a conical skirt depending from said mirror about said post to permit substantial tilting movement of the mirror with respect to it supporting post, a damping liquid in said enclosure about both said mirror and skirt, a retainer ring within said enclosure for limiting the movement of the mirror pivot relative to its seat while permitting tilting movement of the mirror and skirt, and a lens in contact with the damping liquid and disposed in the path of light to and from the mirror to form an image of the aperture.

3. An optical horizontal reference comprising a light source, an aperture for said light source, a pendulous mirror from which the light from said aperture is reflected, an enclosure for said mirror, a post mounted in said enclosure and having a seat in which a pivot on said mirror is disposed for universal tilting movement, a conical skirt depending from said mirror about said post to permit substantial tilting movement of the mirror with respect to its supporting post, a damping liquid in said enclosure about both said mirror and skirt, an outer enclosure about said mirror enclosure also filled with said damping liquid and including a flexible portion permitting expansion of the liquid, a window in said mirror enclosure, and a lens closing said outer enclosure above said window, the light from said aperture passing through said lens, liquid and window in its passage to and from the mirror, said lens forming an image of said aperture.

VICTOR E. CARBONARA.

REFERENCES CITED

The following references are of record in the file of this patent:

UNITED STATES PATENTS

| Number | Name | Date |
|---|---|---|
| 1,216,953 | Creagh et al. | Feb. 20, 1917 |
| 1,412,997 | Bonneau et al. | Apr. 18, 1922 |
| 1,912,358 | Bush | June 6, 1933 |
| 2,026,919 | Stright | Jan. 7, 1936 |
| 2,125,225 | Gourdou | July 26, 1938 |
| 2,319,529 | Britten | May 18, 1943 |

FOREIGN PATENTS

| Number | Country | Date |
|---|---|---|
| 213,306 | Germany | Sept. 17, 1909 |
| 15,079 | Great Britain | June 23, 1914 |